US008719829B2

(12) United States Patent
Mukherjee (10) Patent No.: US 8,719,829 B2
(45) Date of Patent: May 6, 2014

(54) SYNCHRONIZING PROCESSES IN A COMPUTING RESOURCE BY LOCKING A RESOURCE FOR A PROCESS AT A PREDICTED TIME SLOT

(75) Inventor: Maharaj Mukherjee, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 12/700,414

(22) Filed: Feb. 4, 2010

(65) Prior Publication Data

US 2010/0229174 A1 Sep. 9, 2010

Related U.S. Application Data

(60) Provisional application No. 61/158,491, filed on Mar. 9, 2009.

(51) Int. Cl.
*G06F 9/46* (2006.01)
*G06F 9/455* (2006.01)

(52) U.S. Cl.
USPC ................................ 718/103; 718/102; 718/1

(58) Field of Classification Search
USPC ...................... 718/1, 102, 103, 104
See application file for complete search history.

(56) References Cited

U.S. PATENT DOCUMENTS

| 6,052,695 | A | 4/2000 | Abe et al. |
|---|---|---|---|
| 6,370,625 | B1 | 4/2002 | Carmean et al. |
| 6,782,440 | B2 | 8/2004 | Miller |
| 7,089,555 | B2 | 8/2006 | Calvignac et al. |
| 7,111,293 | B1 | 9/2006 | Hersh et al. |
| 7,143,414 | B2 | 11/2006 | Heddes et al. |
| 7,174,434 | B2 | 2/2007 | Blumrich et al. |
| 7,234,027 | B2 | 6/2007 | Kohn et al. |
| 7,246,260 | B2 | 7/2007 | Brown et al. |
| 7,398,525 | B2 * | 7/2008 | Leymann et al. ............. 718/104 |
| 7,568,199 | B2 * | 7/2009 | Bozak et al. ................. 718/104 |
| 8,359,595 | B2 * | 1/2013 | Kaler et al. .................. 718/102 |
| 2002/0078121 | A1 * | 6/2002 | Ballantyne .................... 709/102 |
| 2003/0050068 | A1 * | 3/2003 | Woxberg et al. ............. 455/450 |
| 2004/0078778 | A1 | 4/2004 | Leymann et al. |
| 2005/0027864 | A1 | 2/2005 | Bozak et al. |
| 2005/0108712 | A1 * | 5/2005 | Goyal .......................... 718/100 |
| 2008/0184250 | A1 * | 7/2008 | Hamadi et al. ............... 718/104 |
| 2009/0049268 | A1 * | 2/2009 | Kim et al. .................... 711/170 |
| 2010/0131959 | A1 * | 5/2010 | Spiers et al. ................. 718/105 |

* cited by examiner

*Primary Examiner* — Thomas Lee
*Assistant Examiner* — Phil Nguyen
(74) *Attorney, Agent, or Firm* — Cantor Colburn LLP; H. Daniel Schnurmann (57) ABSTRACT

Synchronizing processes in a computer system includes creating a predictability model for a process. The predictability model establishes a predicted time slot for a resource that will be needed by the process. The method further requires establishing a predictive request for the resource at the predicted time slot. The predictive request establishes a place holder associated with the process. In addition, the method requires accessing another resource needed by the process for a period of time before the predicted time slot, submitting a request for the resource at the predicted time slot, and processing the request for the process at the resource.

4 Claims, 7 Drawing Sheets

SYNCHRONIZING PROCESSES IN A COMPUTING RESOURCE BY LOCKING A RESOURCE FOR A PROCESS AT A PREDICTED TIME SLOT

This non-provisional application claims the benefit of the provisional application filed with the United States Patent and Trademark Office as Ser. No. 61/158,491 entitled "Synchronizing Resources In A Computer System", filed Mar. 9, 2009.

BACKGROUND

Exemplary embodiments of the invention relate to the art of computer system and, more particularly, to synchronizing resources in a computer system.

Current computer systems run a plurality of processes/threads in series and in parallel. Each process/thread vies independently, or in conjunction with associated processes and/or threads, for various shared computer resources. Shared computing resources can be either hardware resources or software resources. Examples of hardware resources are Input/Output systems, memory systems, processing systems, networking systems and the like. Examples of Input/Output systems include keyboard, mouse, and automatic data input/output devices such as, sensors and file read/write systems, USB drives and the like. Examples of memory systems include hard-drives, random access memory (RAM), read only memory (ROM) and/or variations such as, Persistent RAM (PSRAM), Dynamic RAM (DRAM), Static RAM (SRAM), as well as auxiliary memory systems such as, floppy drive, CD-RAM, DVD-RAM, Flash Memory and the like. Examples of processing systems include a Central Processing Unit (CPU) having one or multiple cores, graphics cards, auxiliary processing units such as, floating point accelerators, field programmable gate arrays (FPGA) or ASIC-s, and the like. Examples of network systems include sockets, USB ports, and Ethernet ports. Examples of software resources include virtual memory systems, network monitor programs, network daemons and various other Operating systems and monitoring programs and the like.

Figure 1:
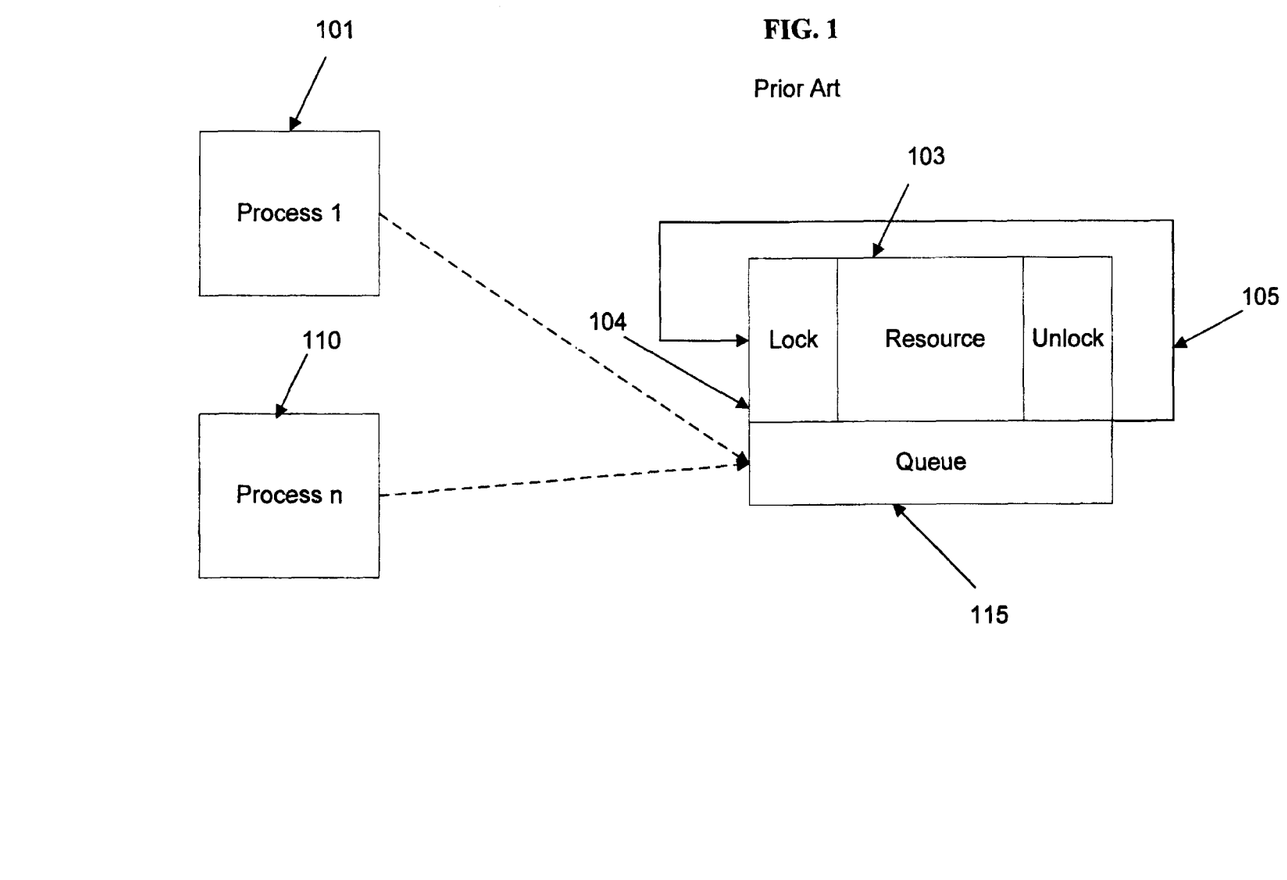
FIG. 1 is block diagram illustrating resource sharing in accordance with the prior art.

Resource synchronization concerns sharing resources between a plurality of process or threads such as shown in FIG. 1. When ready, a process/thread 101 generates a request 102 for a needed resource 103. The request for any particular type of resource depends on the type of computing the requesting process/thread is engaged in at the instant of generating the request. For example, an input request may be generated when the process/thread is expecting a data from an input device, and a memory request may be generated when the device is expected to "fetch" some data from the memory. If available, the resource is locked for access using a lock mechanism 104. Examples of lock mechanisms includes semaphore, mutex and the like. At this point process 101 utilizes the resource as needed. When no longer required, process 101 unlocks 105 resource 103 and exits. At this point, resource 103 is made available for other processes/threads such as indicated at 110. If resource 103 is not available when requested, process 110 joins a queue 115 until process 103 is available.

Items waiting in queue 115 are picked up using methods and algorithms such as Last In First Out (LIFO), First In First Out (FIFO), Least Recently Used (LRU) etc. or based on the priority assigned to the jobs being run by these processes or threads. While in queue 115 for resource 103, process/thread 110 is idle and valuable computations time is wasted. Effectively sharing resources with minimum down time or latency time is an active area of research in the Synchronization of Resources. However, process and threads still spend a lot of time waiting in the queue. Time in the queue could otherwise have been used for computation purposes.

Figure 2:
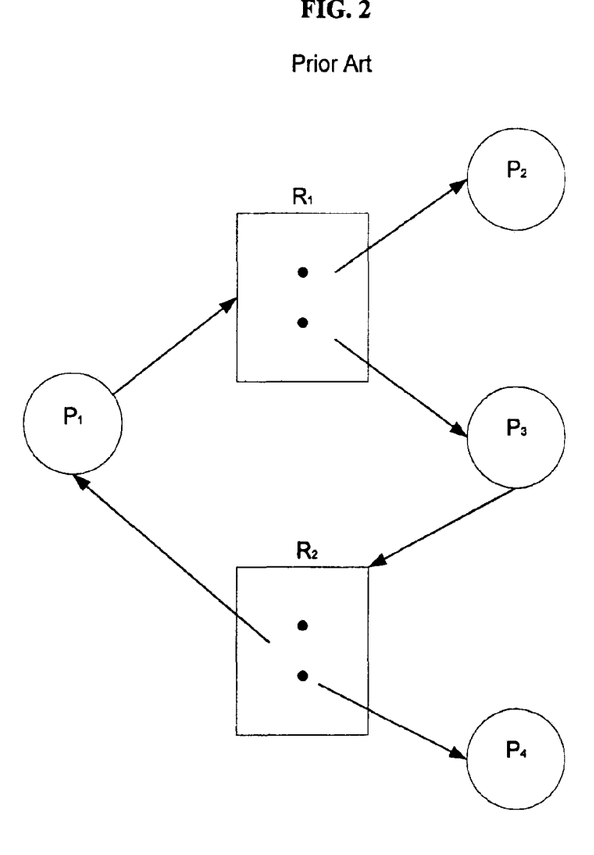
FIG. 2 is a block diagram illustrating a deadlock occurrence in the prior art.

Another serious consequence of making a process wait in a queue is the so-called "DeadLock". Deadlock occurs when a set of blocked processes each holding a resource is waiting to acquire a resource held by another process in the set such as shown in FIG. 2 which illustrates four processes P, P2, P3 and P4 and two resources R1 and R2. Process P1 is waiting in a queue for Resource R2 and also making a request for Resource R1. Process P3 is waiting in a queue for Resource R1 and also making a request for Resource R2. Given that P1 can not come out of R2 unless R1 is available, and P3 can not get out of R1 until R2 becomes available, the system gets into an infinite idle state thereby creating a deadlock.

SUMMARY

Exemplary embodiments of the invention include creating a predictability model for a process. The predictability model establishes a predicted time slot for a resource that will be needed by the process. The exemplary embodiments also include establishing a predictive request for the resource at the predicted time slot. The predictive request establishes a place holder associated with the process. In addition, the exemplary embodiments include accessing another resource needed by the process for a period of time before the predicted time slot, submitting a request for the resource at the predicted time slot, and processing the request for the process at the resource.

System and computer program products corresponding to the above-summarized exemplary embodiments are also described and claimed herein.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 3:
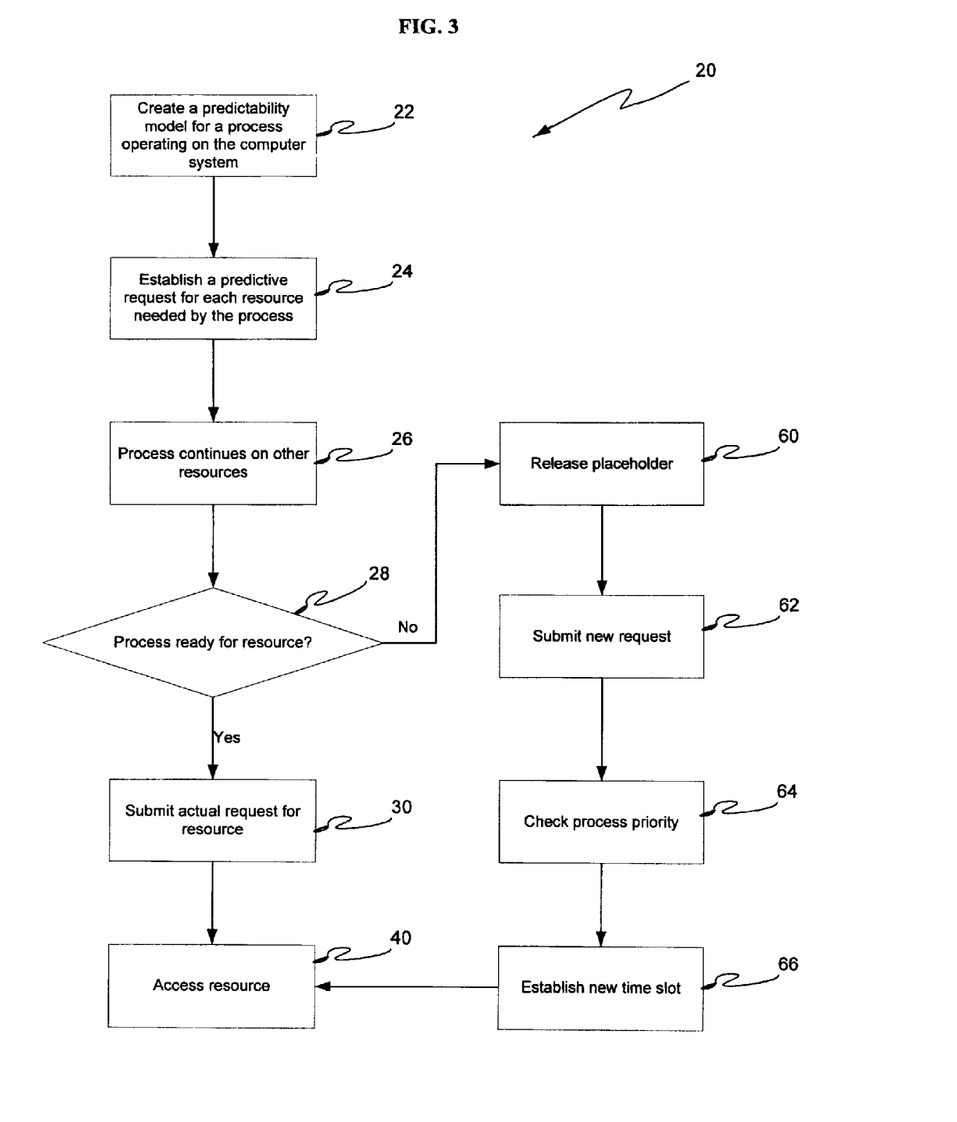
FIG. 3 is a flow chart illustrating a method of synchronizing processes in a computer in accordance with an exemplary embodiment of the invention.

With reference to FIG. 3, a method of synchronizing processes in a computer system in accordance with exemplary embodiments of the invention is indicated generally at 20. At this point, it should be understood that as the synchronization for a process and a thread is similar, the use of the term "process" should be construed to include either a process, a thread or both a process and a thread. Initially, a predictability model is created for each process operating on the computer system as indicated in block 22. The predictability model determines a predicted time slot needed by each process for each computer resource such, as, but not limited to, central processing unit time, memory allocation, keyboard input, mouse input, network access etc. The predicted time slot is based on a probability density function established for the computer system. Once the predicted time slot is determined in block 22, a pseudo or predictive request, e.g., a predictive place holder is established for each resource required by each process, as indicated in block 24. While waiting for the predicted time slot, each process is active or processing on available resources as indicated in block 26. That is, in accordance with exemplary embodiments of the invention, processes do not remain idle while waiting for necessary resources to become available if other needed resources are free.

In further accordance with the exemplary embodiment a process may generate a request for predictive multiple place holders for multiple resources. Also, the predicted place holders may overlap in time for multiple resources. For example, it might be necessary to use a processing resource such as a graphics card and a memory device at the same time. The process may generate predictive place holders for both the graphics card and the memory device which may overlap in the time.

Once the predicted time slot approaches, a determination is made whether the process is ready for the resource as indicated in block 28. If the process is ready for the resource as determined in block 28, an actual request for the resource is submitted as indicated in block 30. At this point, once the time slot arrives, and the resource becomes available, the resource is locked, and accessed/utilized by the process, as indicated in block 40. When the process is complete, the resource is unlocked and made available for additional processes. If, however, the process in not ready for the resource as determined in block 28, the predictive placeholder is released and the time slot made available to other processes as indicated in block 60.

After releasing the place holder in block 60, a new request for a time slot is submitted to the resource as indicated in block 62. At this point, a determination is made as to an overall priority of the process as indicated in block 64. That is, processes having a higher priority are placed ahead of lesser priority processes waiting for the resource. In any event, after determining process priority, a new time slot is established for the process as indicated in block 66. Once the new time slot arrives, the process is ready, and the resource is available, the resource is locked, and accessed/utilized by the process, as indicated in block 40. When the process is complete, the resource is un-locked and made available for additional processes.

Figure 4:
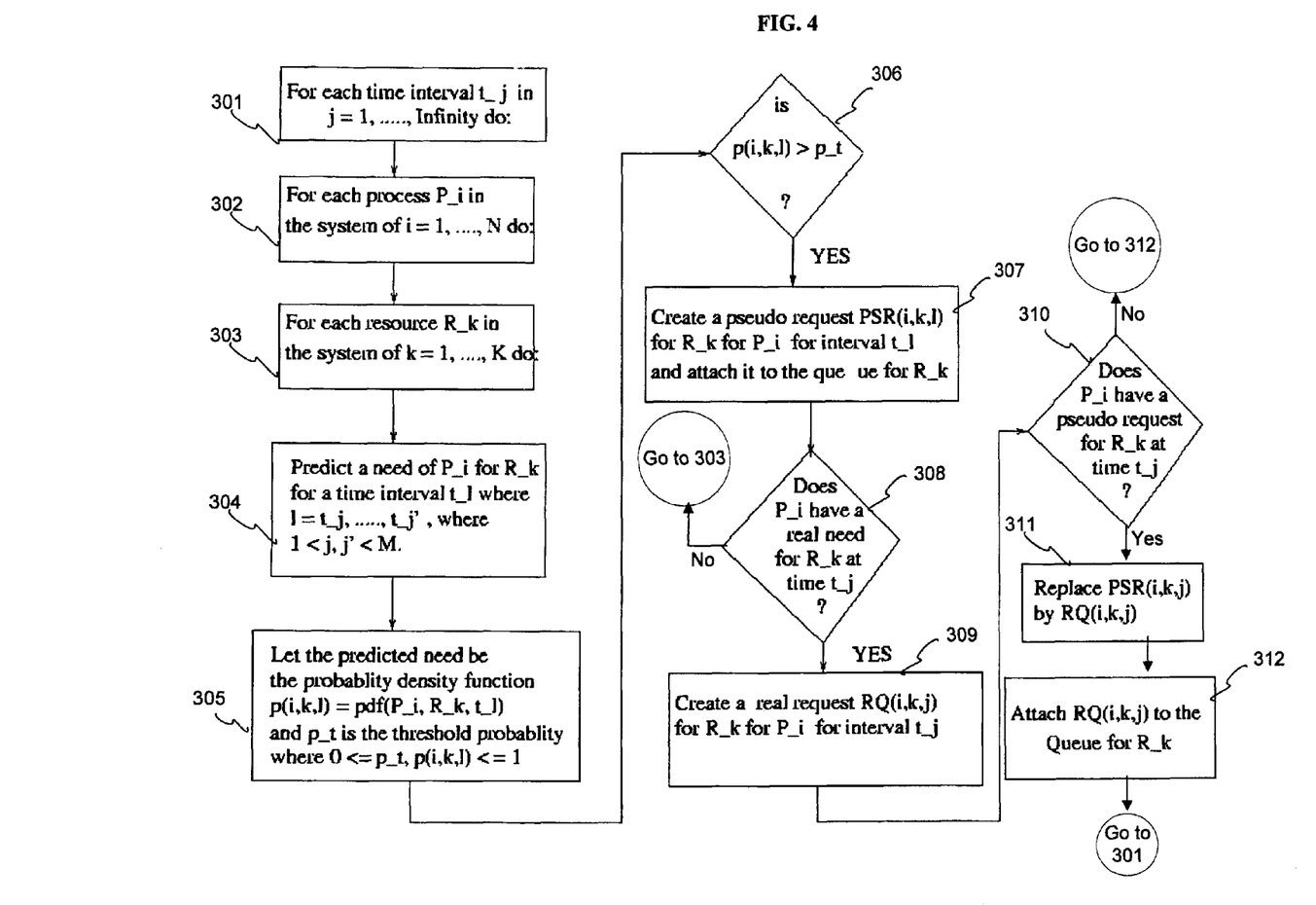
FIG. 4 is flow chart illustrating a method of establishing a predictability model in accordance with exemplary embodiments of the invention.

Reference will now be made to FIG. 4 in describing a method of establishing the predictability model in accordance with exemplary embodiments of the invention. Initially, it should be understood that the predictability model is executed for every time slot $t\_j$ for $j=1, 2$, until infinity such as shown in block 301. For all practical purposes, infinity is a large number or until the system is halted, stopped, shutdown or booted down. In addition, the predictability model is determined for every process in the system $P\_i$ for $j=1, 2$, thru N, where N is the total number of processes or threads in the system, or the number of processes and/or threads that are participating in predictive synchronization such as indicated in block 302. Note that this number N may vary as the number of active processes or threads may change from one time slot to another. This may happen as and when new jobs are created and finished jobs are taken out of the system. The predictability model is also set for every system resources $R\_k$ for $k=1, 2$, thru K, where K is the total number of resources in the system, or the number of resources that are participating in predictive synchronization such as indicated in block 303. Note that this number K may vary as the number of available resources may change from one time slot to another. This may happen as and when new resources are added to the system and faulty or non-functional resources are taken out of the system.

For each process $P\_i$ for $j=1, 2$, thru N, a need for a resource $R\_k$ for $k=1, 2$, thru K, is predicted for each time slots in the future, $t\_l$, where $l=j, j+1, j+2, \ldots, j'$, where both j and j' are limited as $1 \leq j \leq j' \leq M$, where M is a large number such as shown in block 304. The value of M can be decided by the computational efficiency of the system. The system becomes less and less predictable and less and less computationally efficient as M becomes large. A typical value of M can be between about 200 to about 2000.

For each time slot, $t\_l$, where $l=j, j+1, j+2, \ldots, j'$, $1 \leq j \leq j' \leq M$, the probability density function is computed as $p(i,k,l)=\text{pdf}(P\_i, R\_k, t\_l)$, where $P\_i$ is a process for $j=1, 2$, thru N; and $R\_k$ is a resource for $k=1, 2$, thru K such as indicated in block 305. In another embodiment, however, $p(i,k,l)$ is only selectively recomputed or updated. The function $p(i,k,l)$ is computed either as a Predictive Linear Gaussian Model, or Predictive Gauss—Markov Model. They both take the form of:

$$\psi_{(t+n+1)} = \gamma_0 Zt + \Sigma_{i=0,\ldots,n} \Omega(\nu_{t-i+1}, \pi_{t+n+1})$$

The computation of: $\psi_{(t+n-1)}$ can be simplified by choosing selective values in the series.

Figure 5:
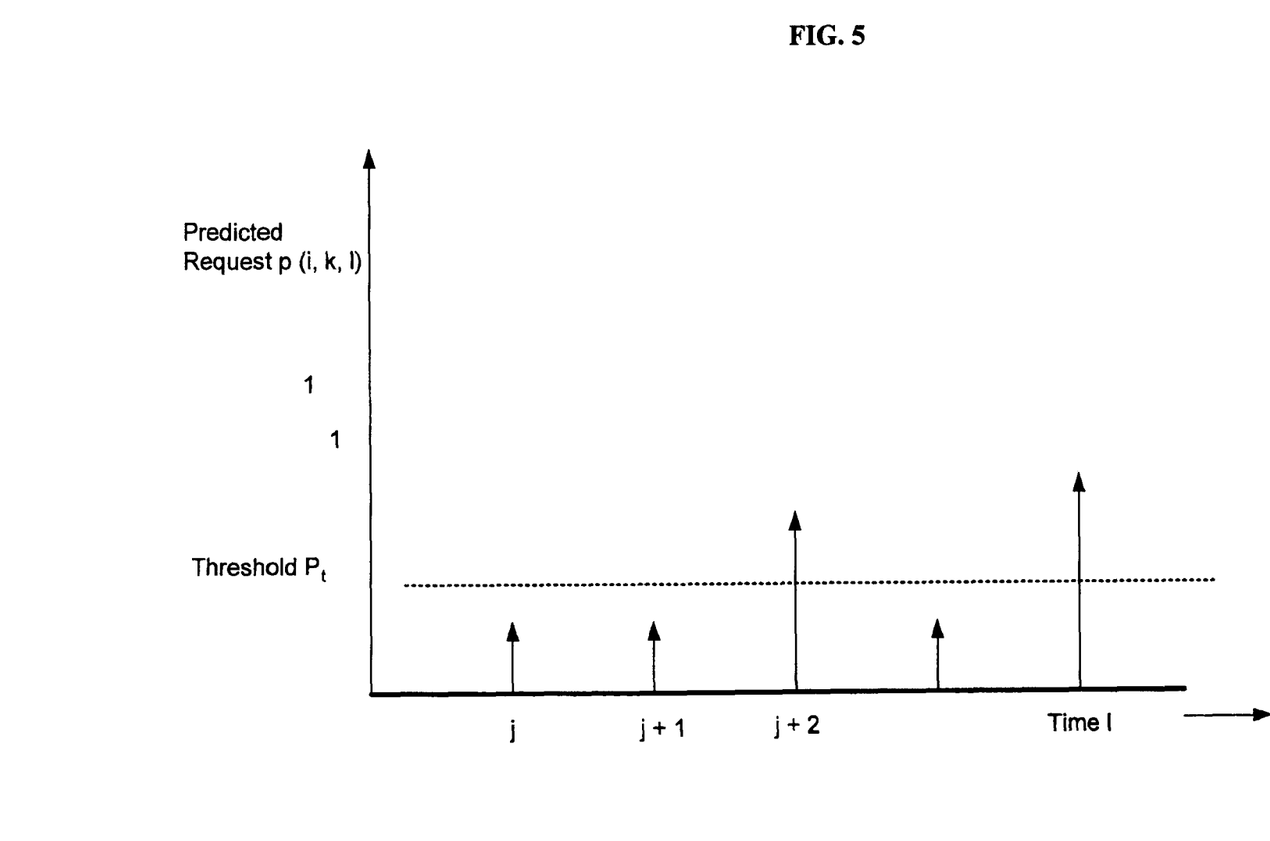
FIG. 5 illustrates a generated probability density function p(i,k,l)

It should also be understood that a threshold probability $p\_t$ is given where $0 < p\_t < 1$ such as shown in FIG. 5 which illustrates a generated probability density function $p(i,k,l)$ is plotted along the time scale l and the threshold probability $p\_t$.

The probability density function $p(i,k,l)$ is compared against the threshold probability $p\_t$ as indicated in block 306. If the value of $p(i,k,l)$ is greater than the threshold probability $p\_t$, a pseudo request $PSR(i,k,l)$ is created for the process $P\_i$ for Resource $R\_k$ for the time slot $t\_l$ such as indicated in block 307. At this point it should be understood that a pseudo request $PSR(i,k,l)$ is not an actual request but rather a predicted request with a high probability that an actual request might happen for the process $P\_i$ for Resource $R\_k$ for the time slot $t\_l$. This can also be construed as the place holder established in block 24.

At any time instance $t\_j$, besides generating pseudo or predicted request for a time slot $t\_l$ in the future, the system can also generate an actual request for a resource such as shown in block 308. If a process $P\_i$ generates an actual request for a resource $R\_k$ at the current instant $t\_j$ in block 308 a real request is generated in block 309. Otherwise, the predictability model returns to block 303 for the next resource.

After the request RQ(i,k,j) is created in block 309, a check for pseudo requests is performed in block 310. More specifically, a determination is made whether a pseudo request PSR (i,k,j) exists for the process P_i for Resource R_k for the time slot t_j. This pseudo request might have been created in the past based on the predictive model as described in block 304 thru block 307. If a pseudo request exists, the pseudo request is replaced by an replaced by the actual request RQ(i,k,j) as indicted in block 311, otherwise RQ(i,k,j) is attached to the resource queue corresponding to the resource R_k in block 312.

Figure 6:
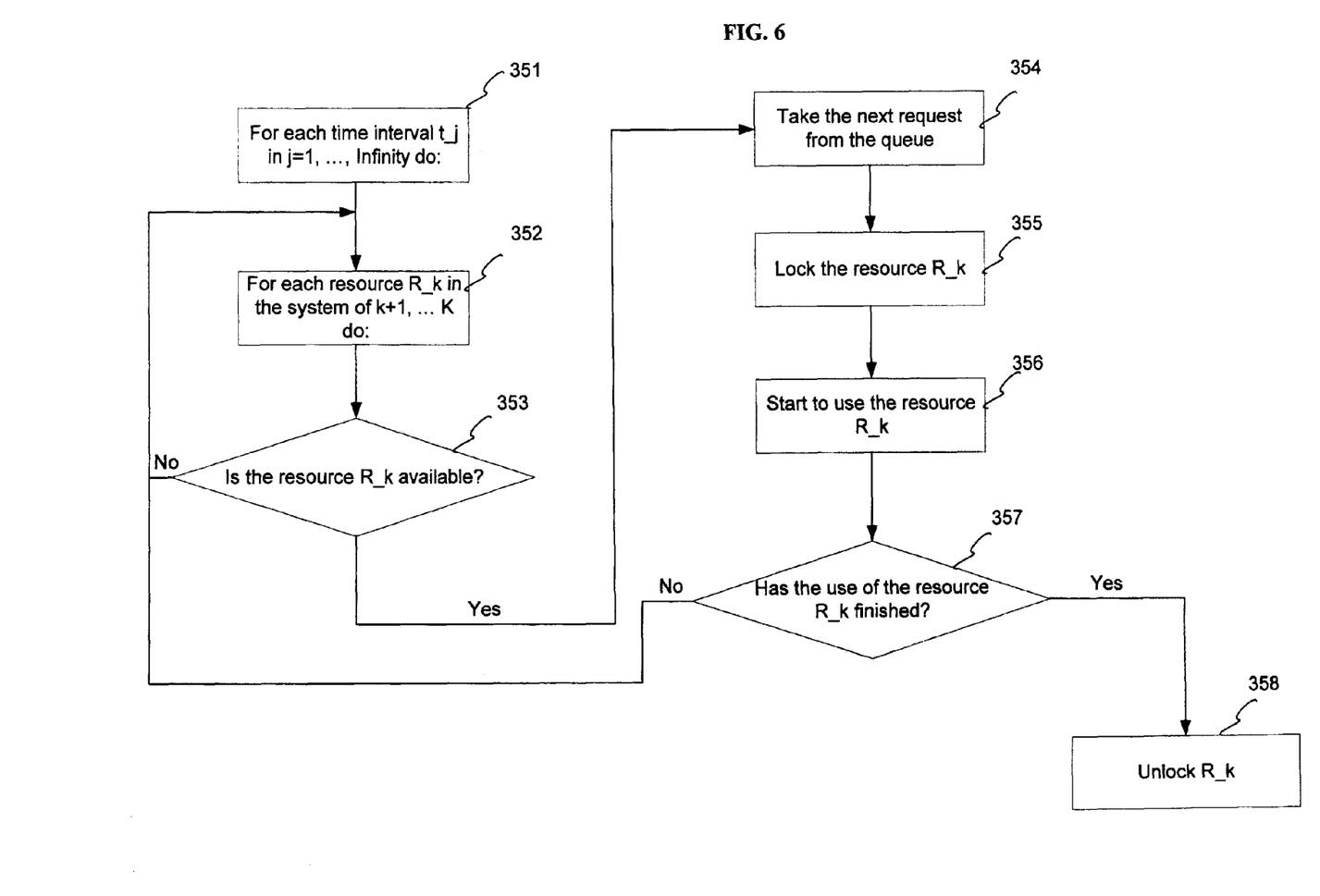
FIG. 6 illustrates a method of establishing a predictive resource synchronization for each resource.

FIG. 6 illustrates a method of establishing a predictive resource synchronization for each resource. Initially, it should be understood that resource synchronization is executed for every time slot t_j for j=1, 2, until infinity as indicated in block 315. For all practical purposes, infinity is a large number or until the system is halted, stopped, shutdown or booted down. In addition, resource synchronization is executed for every Resources in the system R_k for k=1, 2, thru K, where K is the total number of resources in the system, or the number of resources that are participating in the predictive synchronization as indicated in block 352. Note that this number K may vary as the number of available resources may change from one time slot to another. This may happen as and when new resources are added to the system and faulty or non-functional resources are taken out of the system.

At this point, a determination is made whether the Resource R_k is available as indicated in block 353. If R_k is available, a request is taken from the queue as indicated in block 354. Otherwise, the next resource is selected in block 352. In block 354, the next request is taken from the queue associated with R_k. As discussed above, items waiting in the queue can be picked up from the queue using methods and algorithms such as Last In First Out (LIFO), First In First Out (FIFO), Least Recently Used (LRU) etc. or based on the priority assigned to the jobs being run by these processes or threads.

After a request is taken in block 354, resource R_k is locked by the process picked up from the queue in block 355. At this point, resource R_k is utilized by the process picked up from the queue as indicated in block 356. A determination is then made whether the process is finished with resource R_k is finished in block 357. If the process is finished, resource R_k is unlocked in block 358, if the process is not finished, the next resource R_k is checked for availability in block 352.

Figure 7:
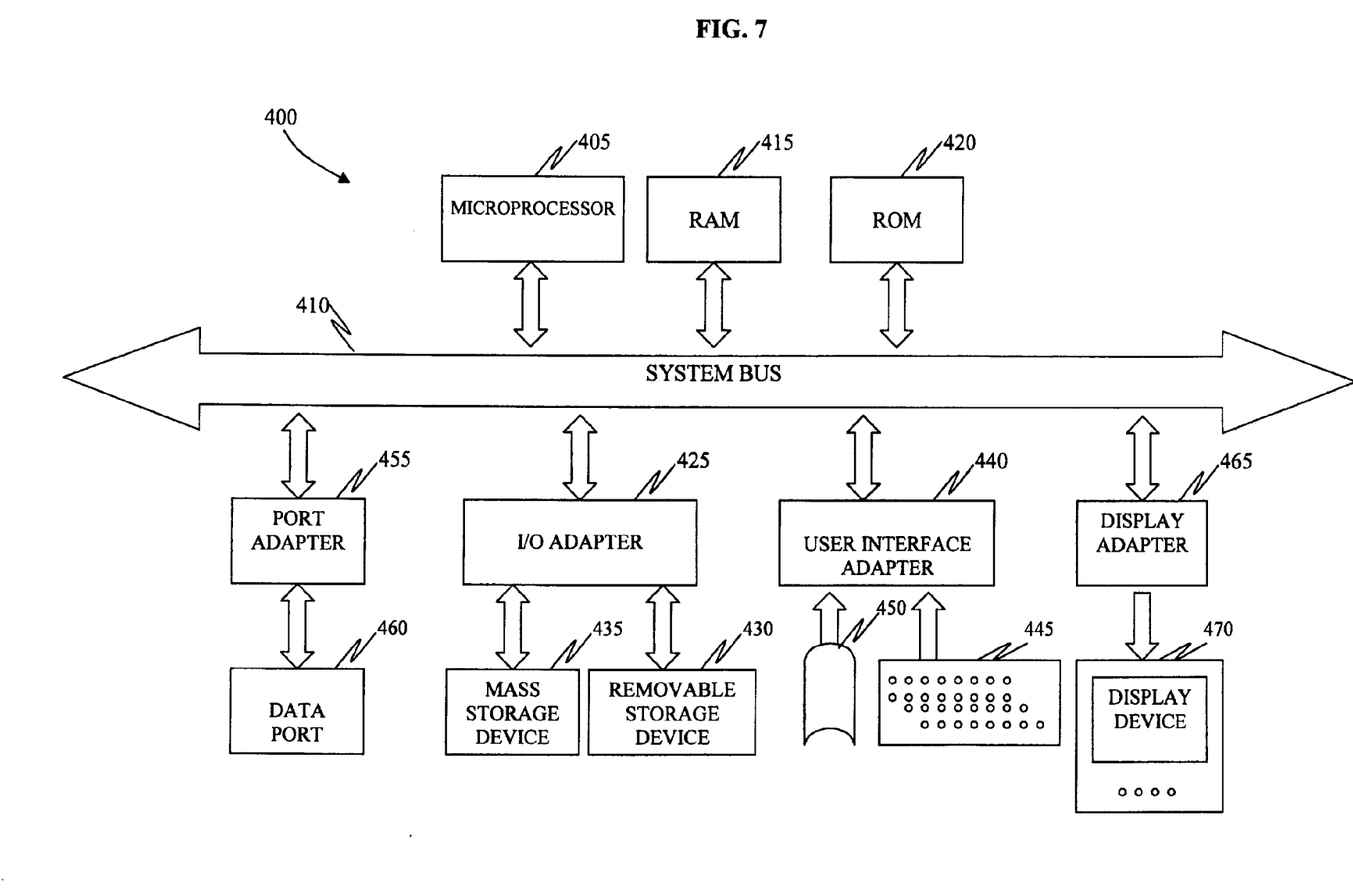
FIG. 7 is a schematic block diagram of a general-purpose computer suitable for practicing the present invention exemplary embodiments.

The capabilities of the present invention can be implemented in software, firmware, hardware or some combination thereof. As one example, the method of synchronizing processes in a computer system described herein is practiced with a general-purpose computer and the method may be coded as a set of instructions on removable or hard media for use by the general-purpose computer. FIG. 7 is a schematic block diagram of a general-purpose computer suitable for practicing the present invention embodiments. In FIG. 7, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

At this point it should be appreciated that exemplary embodiments of the invention enable prediction of a time slot when a resource will be required by a process and establish a predictive place holder at the time slot for the resource. While waiting for the time slot, the process is free to utilize other available resources. As the time slot approaches, the predictive place holder is replaced by an actual request for the resource. In this manner, computing efficiencies are achieved by allowing processes to utilize available resources while waiting for other resources to become available instead of sitting idle in a resource queue.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of synchronizing processes in a computer system, the method comprising:
    creating a predictability model for a process, the predictability model establishing a predicted time slot for a resource that will be needed by the process;
    establishing a predictive request for the resource at the predicted time slot, the predictive request establishing a place holder associated with the process, the place holder locking the resource for the process at the predicated time slot;
    accessing another resource needed by the process for a period of time before the predicted time slot;
    submitting a request for the resource at the predicted time slot;
    processing the request for the process at the resource; and
    releasing the place holder if the process is not ready for the resource at the predicted time slot, wherein the predictability model is established for each process P_i for j=1, 2, thru N where N represents the total number of processes and wherein a need for a resource R_k for k=1, 2, thru K, where K represents the total number of resources, is predicted for each process P_i for j=1, 2, thru N for future time slots in the future, $t\_1$, where $1 = j$, $j+1, j+2 \ldots j'$, where both $j$ and $j'$ are limited as $1 < j < j' < M$ wherein, a probability density function computed as $p(i, k, 1) = pdf(P\_i, R\_k, t\_1)$, where $P\_i$ is a process for $j=1, 2$, thru N; and $R\_k$ is a resource for $k=1, 2$, thru K is determined for each time slot, $t\_i$, where $1 = j, j+1, j+2, \ldots j'$, $1 < j < j' < M$.

2. The method of claim 1, further comprising:
submitting a new request associated with the process for the resource at a new time slot.

3. The method of claim 2, further comprising: determining a processing priority for the process; and establishing the new time slot based on the processing priority.

4. The method of claim 1, wherein the probability density function $p(i, k, 1)$ is computed as one of a Predictive Linear Gaussian Model, and a Predictive Gauss-Markov Model having a form comprising $$\psi_{(t+n+1)} = \gamma_0 Z t + \Sigma_{i=0,\ldots,n} \Omega(\nu_{t+i+1}, \pi_{t+n+1})$$

* * * * *